L. FRANK.
DIRECTION INDICATOR.
APPLICATION FILED APR. 22, 1921.
1,384,249.
Patented July 12, 1921.
2 SHEETS—SHEET 1.
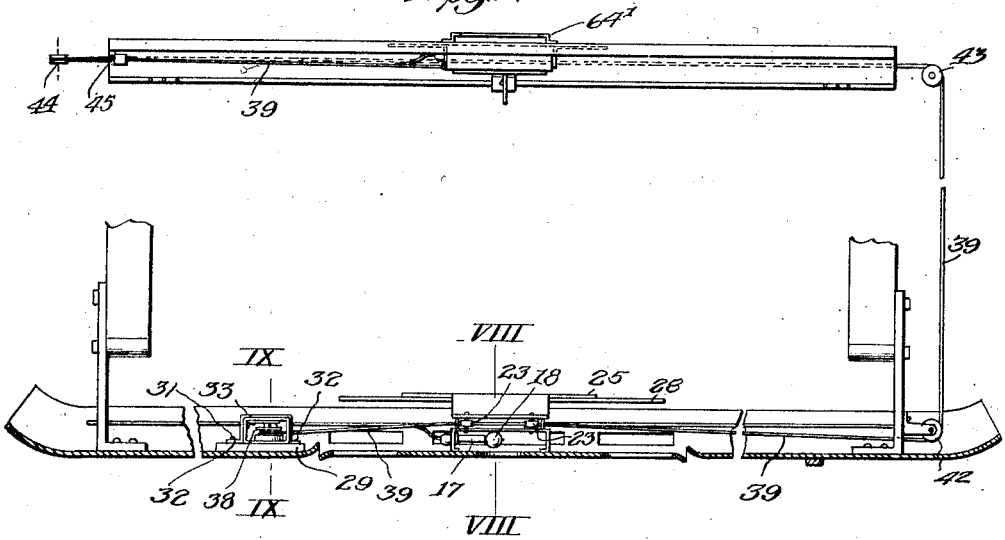
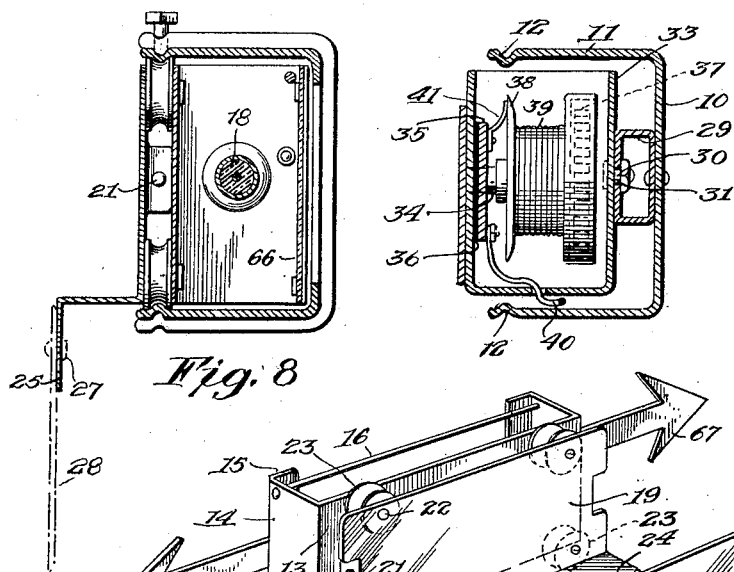
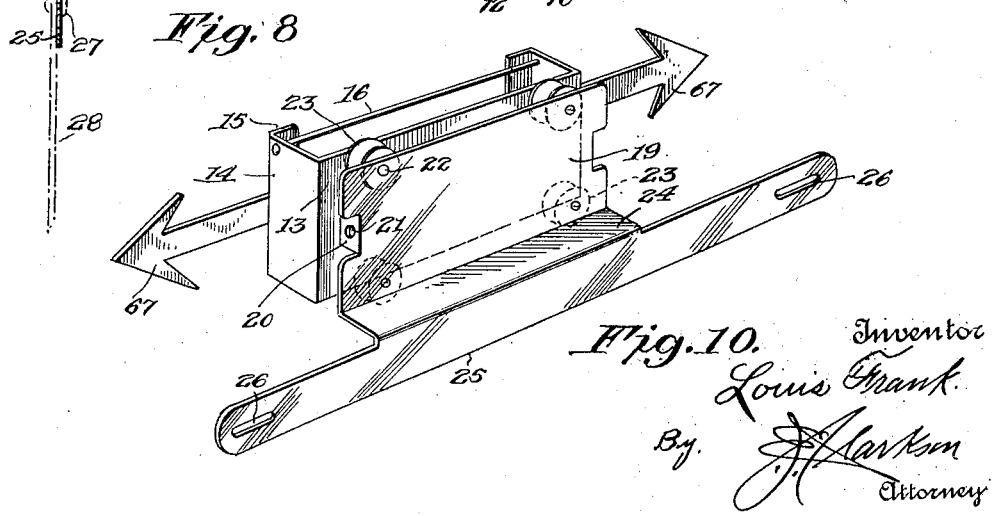
Inventor
Louis Frank.
By
Attorney L. FRANK.
DIRECTION INDICATOR.
APPLICATION FILED APR. 22, 1921.
1,384,249.
Patented July 12, 1921
2 SHEETS—SHEET 2.
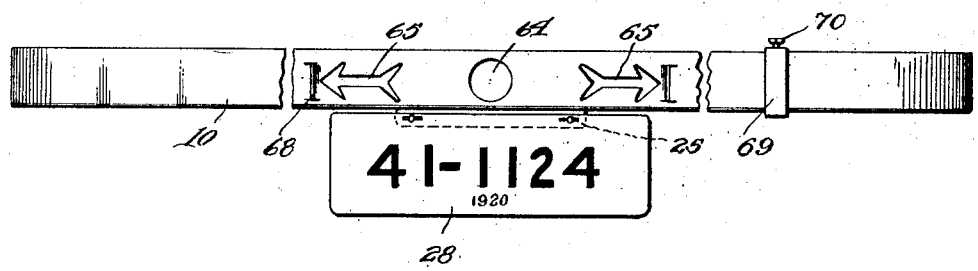
Fig. 2.
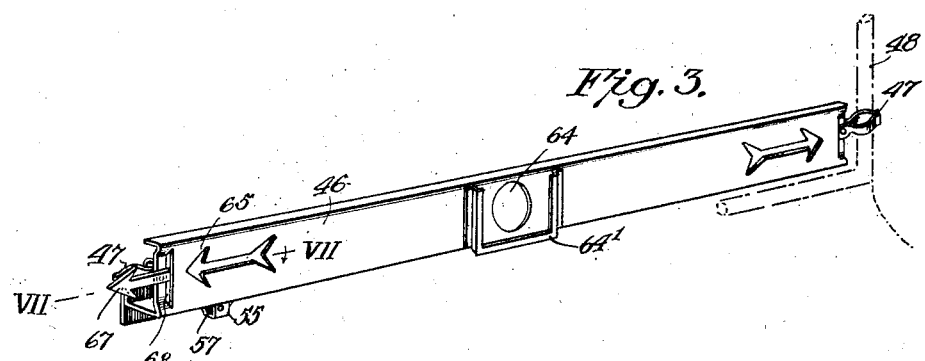
Fig. 3.
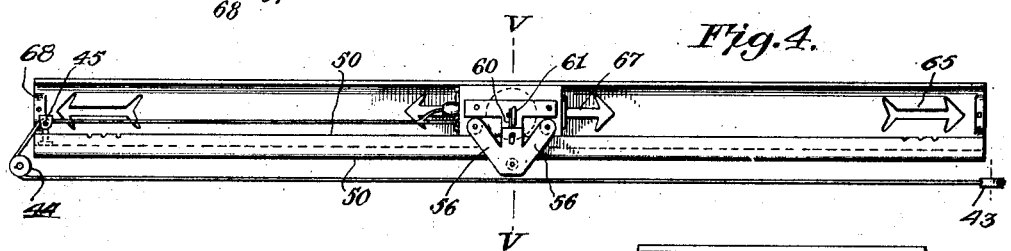
Fig. 4.
Fig. 5.
Fig. 7.
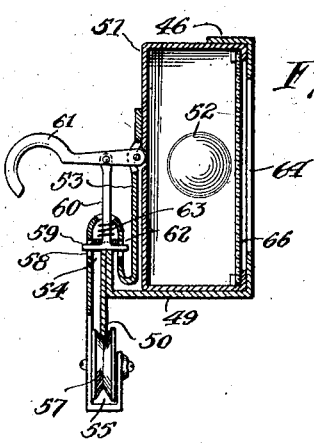
Fig. 6.
Inventor
Louis Frank
By
Attorney

UNITED STATES PATENT OFFICE.

LOUIS FRANK, OF MIAMI, ARIZONA.

DIRECTION-INDICATOR.

1,384,249.  Specification of Letters Patent.  Patented July 12, 1921.

Application filed April 22, 1921. Serial No. 463,519.

*To all whom it may concern:*

Be it known that I, LOUIS FRANK, a citizen of the United States of America, residing at Miami, in the county of Gila and State of Arizona, have invented certain new and useful Improvements in Direction-Indicators, of which the following is a specification.

This invention relates to signals and has special reference to an automobile signal and direction indicator.

More particularly the invention relates to improvements in the automobile signal and direction indicator shown and described in my copending application filed April 7, 1921 and bearing the Serial Number 459,313.

One object of the invention is to improve the general construction of the device shown in my aforesaid copending application.

A second important object of the invention is to provide an improved construction of co-operating lamp holder and guide therefor.

A third important object of the invention is to provide an improved arrangement of conductor cable wherein the conductor cable may act as the tension cord as well as the winding drum cord.

A fourth important object of the invention is to provide indicators at the front and rear of an automobile which will simultaneously move in the same direction and give the same indication.

A fifth important object of the invention is to provide means of improved nature for signaling both by day and night.

A sixth important object of the invention is to provide improved means for taking up wear or distortion on the rear bumper or guide member.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a horizontal sectional view showing the relation of the front and rear parts of the device and also the manner of attaching the rear member to the rear of an automobile.

Fig. 2 is a rear elevation of the rear member.

Fig. 3 is a perspective view of the front member.

Fig. 4 is a rear view of said front member.

Fig. 5 is a section on the line V—V of Fig. 4.

Fig. 6 is a detail sectional view showing the locking device for the front side.

Fig. 7 is a detail sectional view on the line VII—VII of Fig. 3.

Fig. 8 is a detail section on the line VIII—VIII of Fig. 1.

Fig. 9 is a detail section on the line IX—IX of Fig. 1.

Fig. 10 is a perspective view of the rear lamp carriage.

In carrying out the objects of the invention as herein illustrated there is provided a rear bumper member having a web 10 and flanges 11 positioned on the automobile so that the flanges extend forwardly. Close to the forward edges of these flanges each flange is beaded inwardly as at 12 to provide a track. On this track runs the rear lamp consisting of a front plate member having a flat rectangular back 13, end flanges 14 and short front flanges 15, the end flanges being held in proper spaced relation by a cross-bar 16. One of these end flanges is provided with a suitable opening wherethrough extends a socket 17 carrying the lamp 18. Spaced from the plate 13 is a plate 19 which is held in such spaced relation by means of legs 20 at each end, said legs each having a cord receiving opening 21. The plates 19 and 13 are held together by rivets 22 whereon are mounted grooved wheels or rollers 23 which run on the tracks 12 as can be clearly seen by reference to Fig. 8. From the bottom edge of the plate 19 is a flange 24 projecting toward the front of the automobile and carries at its forward end a depending flange 25 having slots 26 in each end to receive the bolts 27 for holding an automobile number plate 28.

Mounted on the member 10 at one side of the machine is a tubular support in the form of a rectangular box 29 having a slot 30 in its front face wherethrough pass bolts 31 which also pass through ends 32 formed on a drum casing 33. Within this drum casing is mounted a shaft 34 carried on a plate 35 separated from the casing by insulation 36. On the shaft 34 is mounted a spiral spring 37 for winding a drum 38 on which is coiled a conductor cable 39 receiving current from a conductor 40 and brush 41 as best seen in Fig. 9. This conductor cable 39 runs through and is secured in the openings 21. After passing through these openings the conductor cable runs over a rear idler pulley 42 to a forward idler pulley 43 from which it passes around an idler pulley 44 suitably fixed on the machine and around a final idler pulley 45 fixed to a front channel member 46. At each end of this channel member 46 is mounted a clamp 47 by means of which the channel member may be attached to the uprights 48 of a wind shield. The channel member 46 is similar to the rear channel member but has attached to its bottom flange a plate 49 bent to present upper and lower edges as at 50. At 51 is a front lamp casing similar in construction to the rear lamp casing and carrying lamp 52. On the rear portion of the casing 51 is a plate 53 which is bent upward and then downward to provide an inverted channel 54, the lower end of the plate being again bent upward to provide a channel 55. From the lower end of the plate extend diverging arms 56 and on the upper ends of these arms and in the channel 55 are located grooved rollers 57 which run on the upper and lower edges 50 of the plate 49. The plate 53 is provided with oppositely disposed slots 58 wherethrough passes a pin 59 having a forwardly extending stem 60 connected at its upper end to a latch and cable member 61. Mounted on the stem 60 is a pressure plate 62 and between this plate and the upper portion of the channel 54 is located a spring 63 which normally holds the plate and pin 59 pressed downward. The upper edge 50 of the plate 49 is provided at suitable points with notches 63 to receive the pin 59. From an inspection of Fig. 1 it will be seen that, as the forward lamp carrier moves to the right the cord arrangement is such that the rear lamp carrier will also lead to the right and this movement to the right may be extended by lifting the latch 61 with the hand and moving the hand to the right. This acts to pull on the cord 39, unwind the drum and tension the spring 37. Upon moving the front lamp carrier to the left the tension of the spring winds the cord up on the drum and moves the rear lamp carrier to the left. Both the front and rear members are provided with centrally disposed openings 64 and laterally disposed arrow shaped openings 65. The lamp carriers have their opposite sides closed by glass panels 66 which are preferably red in color. Thus movement of the lamp carriers to the right or left at night causes a red arrow to appear directed to the appropriate side while the central position of said lamp carriers shows through the central opening. Moreover each lamp carrier has at each end a fit metal arrow 67 which is projectable through a slot 68 formed at the respective end of the front or rear by supporting member as the case may be. These arrows are preferably of a color contrasting with the color of the support member. As for instance the arrows may be white and the supporting member black so that in the day time a visualized indication is had whenever the lamp carriers will move to the left or right positions by the projection of the white arrows to the right or left respectively.

In order to prevent spreading of the guide rails there is provided a U-shaped clip 69 the legs of which overlap the flanges 11. This clip carries a set screw 70 so that screwing down on the set screw will hold the clip in position to prevent spreading of said rails. Furthermore in case of the rails accidentally spreading one or more clips of this character may be used to bring them back into position and retain them when in place.

There has thus been provided a simple and efficient device of the kind described and for the purpose specified.

It is obvious that minor changes may be made in the form and construction of the invention without departing from the material principles thereof. For instance, the vertical portion of the front member may be dispensed with and the guide portion with the edges 50 retained. In this case the wind shield may have a suitably painted strip to display the form opening or arrows. Again, the opening 64 may be surrounded by a flanged rib 64' so that a slip of glass or the like with the owner's initials or other insignia may be dropped in front of the opening 64. It is not therefore desired to confine the invention to the exact form herein shown and described, but it is wished to include all such as properly come within the scope claimed.

Having thus described the invention, what is claimed as new, is:—

1. In combination, a pair of guide members adapted to be supported at opposite ends of an automobile and having display openings therein, a lamp carrier mounted on each of the guide members, and a connection between said carriers arranged to move both carriers simultaneously in the same direction.

2. In combination, a pair of guide members adapted to be supported at opposite ends of an automobile and having display openings therein, a lamp carrier mounted on each of the guide members, a spring wound winding drum carried by one of the guide members, and a flexible element connecting the two carriers and having one end wound on said drum, said element being arranged to move both carriers simultaneously in the same direction.

3. In combination, a pair of guide members adapted to be supported at opposite ends of an automobile and having display openings therein, an electric lamp carrier mounted on each of the guide members and having a lamp socket, a spring wound winding drum carried by one of the guide members, a conductor cord connecting said carriers and having one end wound on said drum, said cord being electrically connected to the sockets and arranged to move the carriers simultaneously in the same direction.

4. In a device of the kind described, a channel member having a vertically disposed web and horizontal flanges each provided with an inwardly directed portion near its free edge to constitute a guide rail, a lamp carrier having upper and lower guide rollers running on said guide rails, and means to move the carrier along said rail.

5. In a device of the kind described, a channel member having a vertically disposed web and horizontal flanges each provided with a guide rail portion adjacent its free edge, said web having a plurality of sight openings therein, a lamp carrier having upper and lower guide rollers running on the guide rail portions, said carrier being open at the side nearest the web, a spring wound winding drum mounted in said channel member, a conductor cord having one end wound on said drum and the other end provided with manually operable adjusting means, and a connection between said cord and carrier arranged to cause movement of the carrier upon movement of the cord.

6. In a device of the kind described, a member provided with a plurality of sight openings, a lamp carrier guided for movement behind said member, a direction indicator connected to and movable with the lamp carrier at each side thereof, said indicators being arranged to be respectively moved into view simultaneously with the movement of the carrier into position behind respective sight openings, and means to move said carrier.

7. In a device of the kind described, a member provided with spaced sight openings each adjacent a respective end of the member, said member further having a slot between each opening and the respective end of the member, a lamp carrier movable along said member to register selectively with either of said openings, means to move said carrier, and pointers carried by the lamp carrier at each side thereof and selectively arranged to project through said slot whenever the lamp carrier is in registry with the sight opening nearest said slot.

8. In a device of the kind described, a channel member having a web and flanges, said web having a sight opening adjacent each end and a slit beyond each sight opening, the material of the web beyond the slit being displaced to an inwardly offset position, a lamp carrier movable in the channel having an indicator at each end projectable through a respective slit to lie in front of the offset web portion adjacent said slit, and means to move said carrier.

9. In combination, a pair of guide members adapted to be supported at opposite ends of an automobile and having display openings therein, a lamp carrier mounted on each of the guide members, a connection between said carriers arranged to move both carriers simultaneously in the same direction, and means to lock one of the carriers releasably in selective positions.

10. In combination, a pair of guide members adapted to be supported at opposite ends of an automobile and having display openings therein, a lamp carrier mounted on each of the guide members, a spring wound winding drum carried by one of the guide members, a flexible element connecting the two carriers and having one end wound on said drum, said element being arranged to move both carriers simultaneously in the same direction, and means to lock one of the carriers releasably in selective positions.

11. In combination, a pair of guide members adapted to be supported at opposite ends of an automobile and having display openings therein, an electric lamp carrier mounted on each of the guide members and having a lamp socket, a spring wound winding drum carried by one of the guide members, a conductor cord connecting said carriers and having one end wound on said drum, said cord being electrically connected to the sockets and arranged to move the carriers simultaneously in the same direction, and means to lock the lamp carrier remote from the drum wound end of the cord releasably in selective positions.

12. In a device of the kind described, a channel member having a vertically disposed web and horizontal flanges each provided with an inwardly directed portion near its free edge to constitute a guide rail, a lamp carrier having upper and lower guide rollers running on said guide rails, means to move the carrier along said rail.

13. In a device of the kind described, a channel member having a web and having flanges beaded inwardly to form guide rails, a lamp carrier having rollers running on said guide rails, and means to prevent spreading of the guide rails and release of the carrier comprising a U-shaped clip arranged with its legs projecting across the flanges, and a set screw carried by a leg of the clip and engaging one of the flanges at the guide rail portion.

In testimony whereof I affix my signature.

LOUIS FRANK.